United States Patent
Soh et al.

(10) Patent No.: US 9,500,930 B1
(45) Date of Patent: Nov. 22, 2016

(54) ON-CHIP ENTANGLED PHOTON SOURCE

(71) Applicant: Sandia Corporation, Albuquerque, NM (US)

(72) Inventors: Daniel B. S. Soh, Pleasanton, CA (US); Scott E. Bisson, Livermore, CA (US)

(73) Assignee: Sandia Corporation, Albququerque, NM (US)

( * ) Notice: Subject to any disclaimer, the term of this patent is extended or adjusted under 35 U.S.C. 154(b) by 0 days.

(21) Appl. No.: 15/065,528

(22) Filed: Mar. 9, 2016

Related U.S. Application Data

(60) Provisional application No. 62/132,100, filed on Mar. 12, 2015.

(51) Int. Cl.
*G02F 1/35* (2006.01)
*G02F 1/39* (2006.01)

(52) U.S. Cl.
CPC ........... *G02F 1/3526* (2013.01); *G02F 1/3536* (2013.01); *G02F 1/39* (2013.01)

(58) Field of Classification Search
None
See application file for complete search history.

(56) References Cited

U.S. PATENT DOCUMENTS

| | | | |
|---|---|---|---|
| 7,373,059 B2 | 5/2008 | Spillane et al. | |
| 7,570,365 B2 | 8/2009 | Trifonov et al. | |
| 8,717,666 B2 | 5/2014 | Nguyen | |
| 9,143,266 B2 | 9/2015 | Mower et al. | |
| 9,268,195 B1* | 2/2016 | Camacho | G02F 1/3536 |
| 2015/0117826 A1* | 4/2015 | Mazur | G02F 1/355 385/124 |
| 2015/0261058 A1* | 9/2015 | Silverstone | G02F 1/395 385/3 |

OTHER PUBLICATIONS

Azzini, et al., "Four-Wave Mixing and Generation of Correlated Photon Pairs in Silicon Ring Resonators and Photonic Molecules", In CLEO: 2013 Technical Digest, 2013 Optical Society of America, 2013, 2 pages.
Collins, et al., "Low Raman-Noise Correlated Photon-Pair Generation in a Dispersion-Engineered Chalcogenide As2S3 Planar Waveguide", In Optics Letters, vol. 37, No. 16, 2012 Optical Society of America, Aug. 15, 2012, pp. 3393-3395.
Engin, et al., "Photon Pair Generation in a Silicon Micro-Ring Resonator with Reverse Bias Enhancement", In Optical Express 27826, 2013 Optical Society of America, Nov. 6, 2013, 9 pages.
Horn, et al., "Monolithic Source of Photon Pairs", In Physical Review Letters PRL 108, 153605, 2012 American Physical Society, Apr. 13, 2012, pp. 153605-1-153605-5.
Jiang, et al., "A Silicon-Chip Source of Bright Photon-Pair Comb", 2012, pp. 1-29.
Kumar, et al., "Spectrally Multiplexed and Tunable-Wavelength Photon Pairs at 1.55um from a Silicon Coupled-Resonator Optical Waveguide", In Optics Letters, vol. 38, No. 16, 2013 Optical Society of America, Aug. 15, 2013, pp. 2969-2971.
Xiong, et al., "Slow-Light Enhanced Correlated Photon Pair Generation in a Silicon Photonic Crystal Waveguide", In Optics Letters, vol. 36, No. 17, 2011 Optical Society of America, Sep. 1, 2011, pp. 3413-3415.

* cited by examiner

*Primary Examiner* — Hemang Sanghavi
(74) *Attorney, Agent, or Firm* — Medley, Behrens & Lewis, LLC

(57) ABSTRACT

Various technologies pertaining to an on-chip entangled photon source are described herein. A light source is used to pump two resonator cavities that are resonant at two different respective wavelengths and two different respective polarizations. The resonator cavities are coupled to a four-wave mixing cavity that receives the light at the two wavelengths and outputs polarization-entangled photons.

20 Claims, 4 Drawing Sheets

ON-CHIP ENTANGLED PHOTON SOURCE

RELATED APPLICATION

This application claims priority to U.S. Provisional Patent Application No. 62/132,100, filed Mar. 12, 2015, and entitled "ON-CHIP ENTANGLED PHOTON SOURCE", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Quantum optics now finds applications in quantum communication, quantum computing, and quantum sensing. In these quantum optics applications, photon sources are used that are designed to emit a photon stream having a controlled number of photons. In order to provide the necessary control over the output characteristics of the photon stream, these sources rely on materials and structures that are difficult to implement in chip-scale integrated circuit devices.

SUMMARY

The following is a brief summary of subject matter that is described in greater detail herein. This summary is not intended to be limiting as to the scope of the claims.

Technologies pertaining to an entangled photon source implemented on a single chip substrate are described herein. In an exemplary embodiment, a photonic circuit comprises a narrowband laser that acts as a pumping source for a group of waveguide resonators. The laser emits light over a range of wavelengths and the light is received by two optical resonators each resonant at a different respective wavelength in the range of wavelengths and at a different respective polarization state. The two optical resonators output light in the two respective wavelengths to a four-wave mixing cavity that accommodates both orthogonal polarization states. The four-wave mixing cavity then outputs pairs of entangled photons, the pairs of entangled photons having respective third and fourth wavelengths with disparate polarization states that are entangled. Therefore, there are two degrees of freedom that are entangled between the photons of the two newly generated third and fourth wavelengths. The number of photons in the two wavelengths are equal and the polarization states of the two wavelengths are orthogonal and maximally entangled. In other words, with respect to the polarization, it is certain that the two polarization states are orthogonal, but there is a fifty percent chance that, for example, the third wavelength is horizontally polarized and the fourth wavelength is vertically polarized, and a fifty percent chance that the third wavelength is vertically polarized and the fourth wavelength is horizontally polarized.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
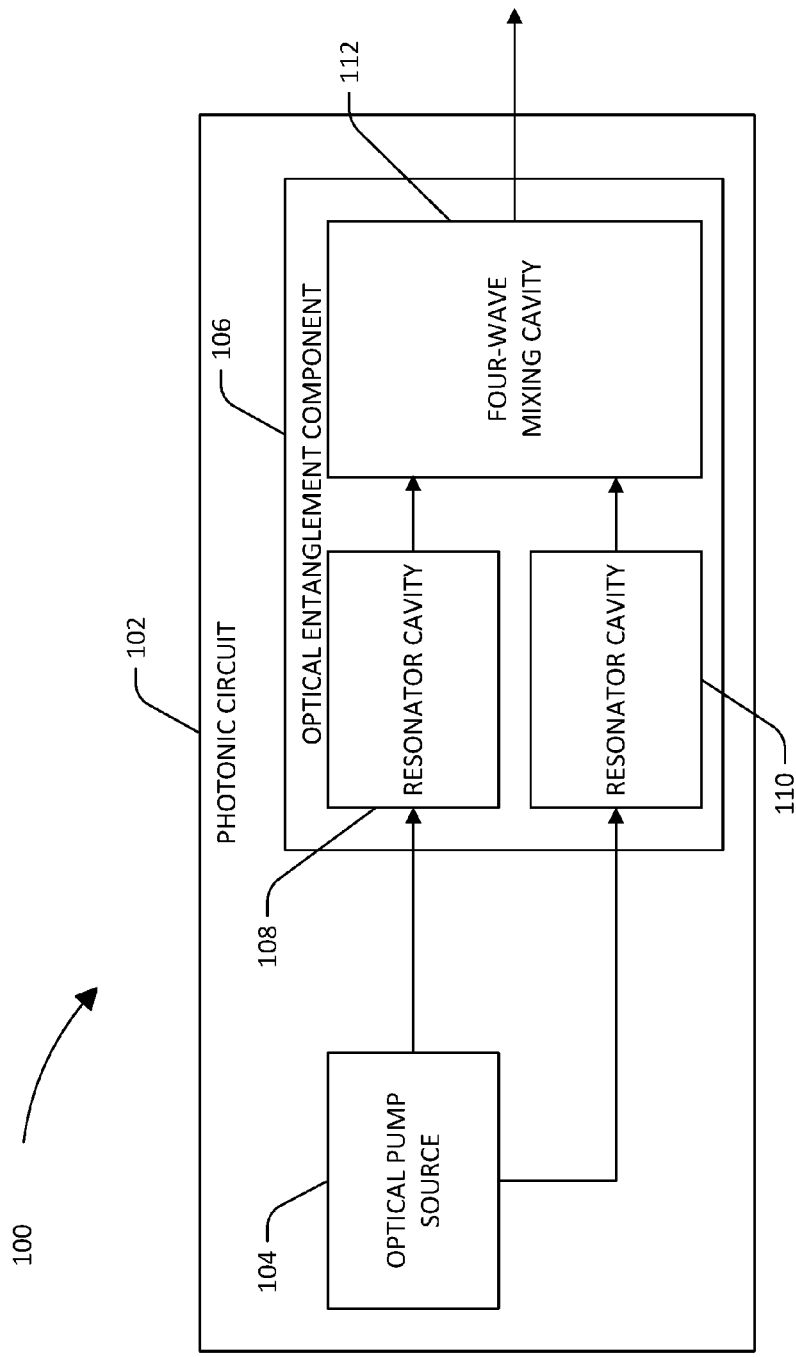
FIG. 1 is a block diagram of an exemplary photonic circuit that facilitates generation of entangled photon pairs.

Various technologies pertaining to an on-chip entangled photon source are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

With reference to FIG. 1, an exemplary system 100 that facilitates an on-chip implementation of an entangled photon source is illustrated. The system 100 includes a photonic circuit 102 that comprises an optical pump source 104 that emits light. The photonic circuit 102 further comprises an optical entanglement component 106 that comprises resonator cavities 108-110 and a four-wave mixing (FWM) cavity 112, where the optical entanglement component 106 receives light emitted from the optical pump source 104. The photonic circuit comprises a plurality of components deposited or installed on a same substrate. As used herein, the term "on-chip" refers to a component or device deposited, installed upon, or comprising a substrate (e.g., a semiconductor substrate). In an example, the same substrate comprises a silicon-based substance (e.g., silicon dioxide). As indicated above, the optical entanglement component 106 is optically coupled to the optical pump source 104, and outputs pairs of quantum-entangled photons.

Details of operation of the system 100 are described below. The optical pump source 104 is an optical source that outputs light in a narrow band of wavelengths. In non-limiting examples, the optical pump source 104 can emit light with a bandwidth of between 1-10 nanometers, with a bandwidth between 5 and 20 nanometers, with a bandwidth of 15-40 nanometers, with a bandwidth of 5-100 nanometers, etc. Further, the optical pump source 104 can comprise a single-frequency laser that emits light with a highest intensity at a center wavelength (e.g., 1550 nm) and lower intensities at wavelengths on either side of the center wavelength. In a further example, the optical pump source 104 can additionally include a doped fiber amplifier (DFA) that amplifies the light from the laser. In the further example, an intensity of the light emitted by the optical pump source 104 (e.g., subsequent to the light being amplified) can be on the order of 100 mW. The optical pump source 104 emits light in pulses. When the optical pump source 104 is excited to generate a pulse, photons are emitted according to some probability distribution. The power of the pump source 104 can be adjusted either to increase or decrease the probability of generating the third and the fourth wavelength photons via a four-wave mixing process. The probability to create the entangled photon pairs at the third and the fourth wavelengths follows the Poisson distribution. For example, in a given pulse the probability of emitting one photon can be approximately 10%, the probability of emitting two photons can be approximately 0.45%, and the probability of emitting zero photons can be approximately 90%, with a small probability of emitting some other number of photons.

The optical pump source 104 is optically coupled to resonator cavities 108-110. The first resonator cavity 108 is resonant at a first wavelength, $\lambda_1$, and at a first polarization state $p_1$, while the second resonator cavity 110 is resonant at a second wavelength $\lambda_2$, which is different from $\lambda_1$, and at a second polarization state $p_2$ orthogonal to $p_1$. The wavelengths $\lambda_1$ and $\lambda_2$ are present in the light emitted from the optical pump source 104. When light enters the first resonator cavity 108, light of the first resonant wavelength $\lambda_1$ is amplified due to constructive interference while light of non-resonant wavelengths is attenuated due to losses in the first resonator cavity 108. Similarly, when light enters the second resonator cavity 110, light of the second resonant wavelength $\lambda_2$ is amplified while light of non-resonant wavelengths is attenuated. The resonator cavities 108-110 therefore act as filters that pass light of their respective resonant wavelengths and polarization states. A resonant wavelength of a resonator cavity depends on parameters of its construction. By way of an example, the resonator cavities 108-110 can be ring resonators, and a resonant wavelength is based upon a diameter of the ring resonator. Resonator cavity 108, resonant at $\lambda_1$, receives the light from the optical pump source 104 and filters light at wavelengths other than $\lambda_1$. Likewise, resonator cavity 110 receives the light from the pump source 104 and filters light at wavelengths other than $\lambda_2$. In an example, the resonator cavities 108-110 comprise optical ring resonators that are implemented as an arrangement of waveguides on a chip substrate.

The resonator cavities 108-110 are each further optically coupled to the FWM cavity 112, which is quadruply resonant at $\lambda_1$ and $\lambda_2$, as well as additional wavelengths $\lambda_s$ and $\lambda_i$. In an example, the FWM cavity 112 is a ring resonator cavity with a free spectral range matching the differences $(\lambda_2-\lambda_i)=(\lambda_i-\lambda_s)=(\lambda_s-\lambda_1)$ (if $\lambda_1<\lambda_s<\lambda_i<\lambda_2$), where the energy conservation requires $(\lambda_1+\lambda_2)=(\lambda_s+\lambda_i)$. Losses in the FWM cavity due to photon absorption via free carriers generated by the strong lights $\lambda_1$, $\lambda_2$ can be mitigated by doping waveguide materials of the ring resonator to absorb free electron or hole carriers. In another example, the FWM cavity is a waveguide comprising an i-type semiconductor material, surrounded by an outer p-type semiconductor material and an inner n-type semiconductor material. When a voltage is induced between the p-type material and the n-type material, free carriers in an optical cavity of the waveguide are absorbed by either the n-type or p-type material.

The FWM cavity 112 receives light having the wavelength $\lambda_1$ and the polarization $p_1$ from the first resonator cavity 108, and also receives light having the wavelength $\lambda_2$ and the polarization $p_2$ from the second resonator cavity 110. The FWM cavity 112 comprises a material that exhibits a third-order optical nonlinearity under certain optical conditions. In an example, the FWM cavity 112 comprises a typical optical waveguide made with Si or $Si_3N_4$ surrounded by $SiO_2$ that has a lower refractive index. Such Si or $Si_3N_4$ material exhibits a third-order optical nonlinearity when a light with a sufficiently large intensity passes through. The third-order optical nonlinearity is the source for the FWM process. As a result of these third order effects, when the FWM cavity 112 receives light of the two wavelengths $\lambda_1$, and $\lambda_2$, the two new wavelengths $\lambda_s$ and $\lambda_i$ are formed. Since momentum is conserved in the FWM process, polarizations $p_s$ and $p_i$ of the light of respective wavelengths $\lambda_s$ and $\lambda_i$ depends on the polarizations $p_1$ and $p_2$ of the light received by the FWM cavity 112 from the resonator cavities 108-110. Thus, for example, if polarization $p_1$ is vertical and polarization $p_2$ is horizontal, by the conservation of momentum it must either be that $p_s$ is horizontal and $p_i$ is vertical or that $p_s$ is vertical and $p_i$ is horizontal. The result is that the FWM cavity 112 outputs polarization-entangled photons. Therefore, the polarization state of the composite quantum state of $\lambda_s$ and $\lambda_i$ is a maximally entangled state under the Bell polarization basis. Since the polarization states $p_s$ and $p_i$ are entangled, knowing one of the polarization states is sufficient to determine the other state.

The entangled photons generated on-demand by the photonic circuit 102 can be used in a variety of applications. In one example, the entangled photons can be used in a heralded single-photon source in a quantum key distribution (QKD) transmitter. By using a transmitter that generates pairs of entangled photons and transmits only one photon of an entangled pair, two parties to communication can identify whether a transmission has been intercepted as part of a man-in-the-middle attack. In another example, a quantum computing device can perform computing operations based upon entangled photon pairs generated by the photonic circuit 102. In still yet another example, entangled photon pairs generated by the photonic circuit 102 can be used to perform quantum remote sensing, wherein entangled photon pairs can be used to probe a feature of interest remotely.

Figure 2:
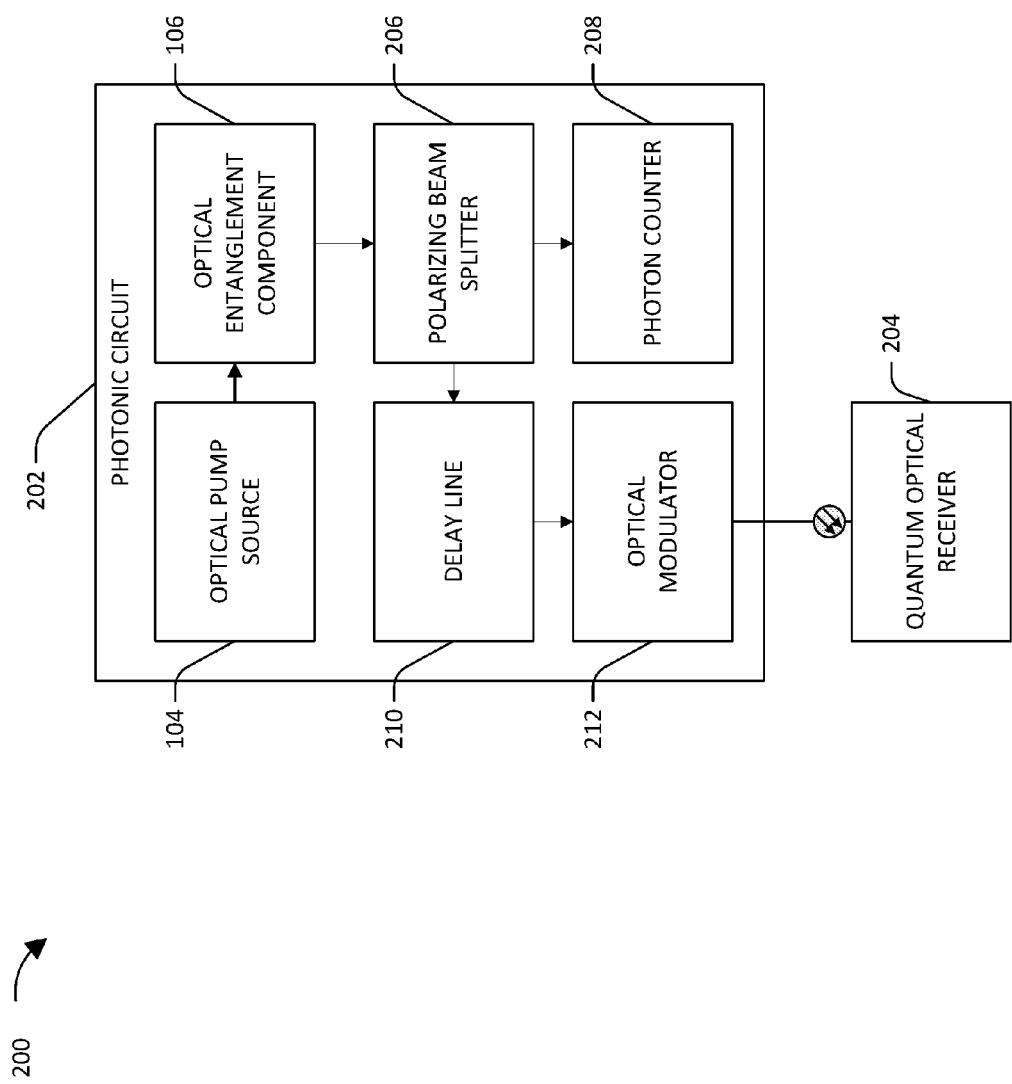
FIG. 2 is a block diagram of an exemplary system that facilitates quantum communication via an on-chip heralded single-photon source.

Referring now to FIG. 2, an exemplary system 200 that facilitates quantum communication via an on-chip heralded single-photon source is illustrated. In certain quantum communications protocols and other applications, it is desirable that only single photons be transmitted at a time. The BB84 communications protocol, for example, is vulnerable to attack if multiple photons are transmitted in a single pulse. An attacker can intercept one of the photons and gain information without perturbing the remaining photons and thereby revealing her presence on the communications channel. Since the optical pump source 104 can emit pulses of varying numbers of photons according to a probabilistic distribution, the optical entanglement component 106 can emit more than one pair of photons for a single pulse of the optical pump source 104.

The system 200 includes a photonic circuit 202 that acts as a transmitter in a quantum communication system, and a quantum optical receiver 204. The photonic circuit 202 and the quantum optical receiver 204 can communicate according to known quantum communications protocols such as, for example, the BB84 quantum key distribution (QKD) protocol. The quantum optical receiver 204 can be a photonic circuit or any other device capable of acting as a receiver in a quantum communication protocol. The photonic circuit 202 comprises the optical pump source 104 and the optical entanglement component 106 that outputs polarization-entangled photons as described above with respect to FIG. 1. The optical pump source 104, as discussed above, emits light in pulses of varying numbers of photons, and the output of the optical entanglement component 106 comprises a correspondingly varying number of photons.

The photonic circuit 202 further comprises a polarizing beam splitter 206 that receives the photons from the optical entanglement component 106 and diverts them along different paths according to their wavelength. Photons of a first wavelength, say $\lambda_s$, are diverted to a photon counter 208 while photons of a second wavelength, say $\lambda_i$, are diverted to a delay line 210. The photon counter 208 counts a number of photons of the wavelength $\lambda_s$ that it receives, while corresponding entangled photons of the wavelength $\lambda_i$ are delayed by some amount of time via the delay line 210 before they are received at an optical modulator 212. As discussed above with respect to FIG. 1, the optical entanglement component 106 outputs equal numbers of photons of respective orthogonal polarizations as a result of the conservation of energy and momentum in the FWM process. Thus, the number of photons of wavelength $\lambda_s$ counted by the photon counter is equal to a number of polarization-entangled photons of wavelength $\lambda_i$ that pass through the delay line 210 to the optical modulator 212. The $\lambda_s$ photons can therefore be said to "herald" the $\lambda_i$ photons.

Figure 3:
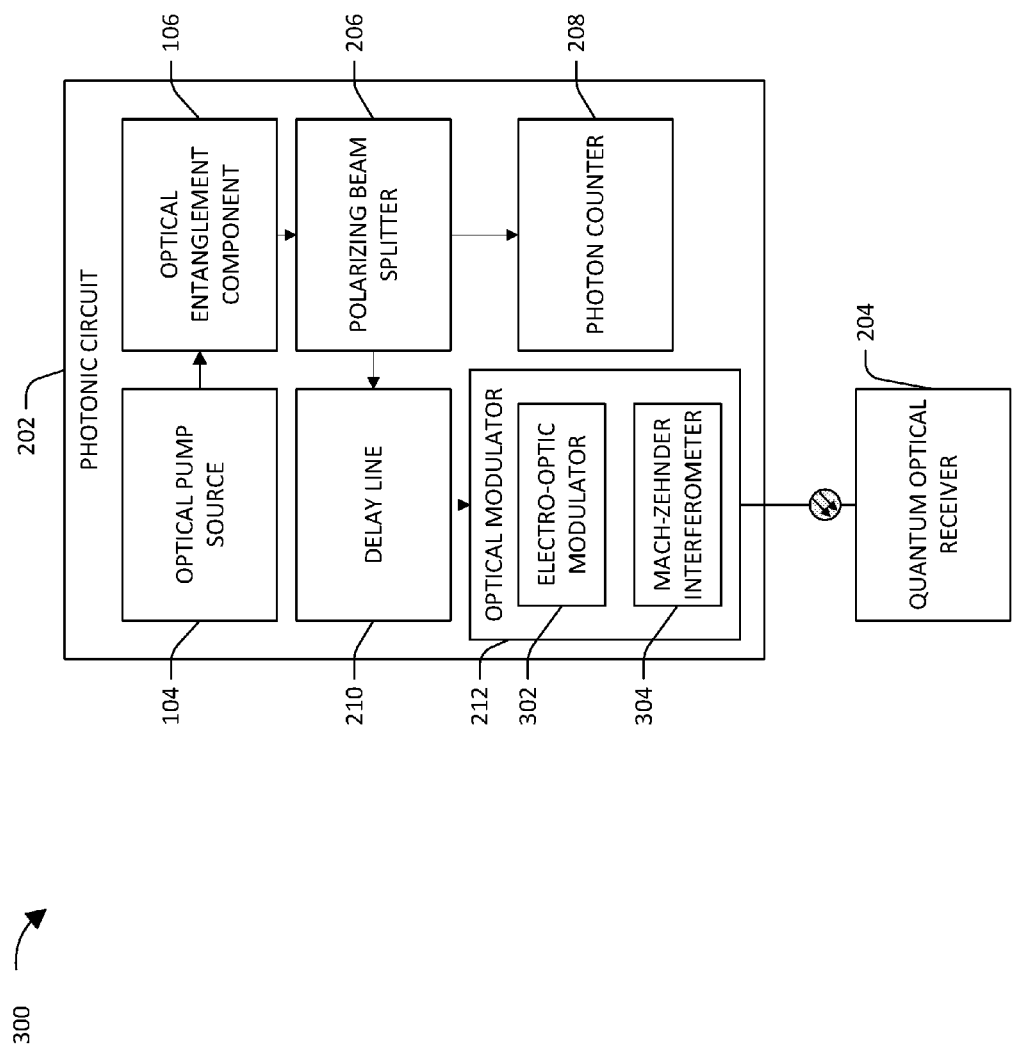
FIG. 3 is a block diagram of an exemplary system that facilitates quantum communication via an on-chip heralded single-photon source using an electro-optic modulator to control a transmitter output.

The optical modulator 212, responsive to the photon counter 208 determining a number of $\lambda_s$ photons received from the polarizing beam splitter 206, can either block or pass on the photons of $\lambda_i$ received from the polarizing beam splitter 206 via the delay line 210. The amount of time by which the delay line 210 delays the $\lambda_i$ photons depends upon a length of time needed for the photon counter 208 to determine a number of $\lambda_s$ photons in the pulse. In an exemplary embodiment, the optical modulator 212 is configured to block transmission of a pulse of photons when a number of corresponding entangled photons of the pulse received at the photon counter 208 is greater than one, and to allow transmission when the number of corresponding entangled photons received at the photon counter 208 is one. In one example, the optical modulator 212 comprises an acousto-optic modulator 212 that acts as a switch for the output of the photonic circuit 202. In another example, and referring now to FIG. 3, a system 300 in which the optical modulator 212 comprises an electro-optic modulator (EOM) 302 and a Mach-Zehnder interferometer 304 is illustrated. The EOM 302 can modulate a phase of one of two input legs of the Mach-Zehnder interferometer 304. When the phase of the leg modulated by the EOM 302 is in phase with the other leg, the photon is passed to the receiver 204. When the phase of the leg modulated by the EOM 302 is out of phase with the other leg of the Mach-Zehnder interferometer 304, the photons are not transmitted to the receiver 204. Thus, the optical modulator 212 comprising the EOM 302 and the Mach-Zehnder modulator 304 also effectively operates as a switch on the output of the photonic circuit 202. The optical modulator 212 allows the photonic circuit 202 to output a single photon at a time, even though the optical pump source 104 emits photons in varying numbers according to the probabilistic distribution.

Figure 4:
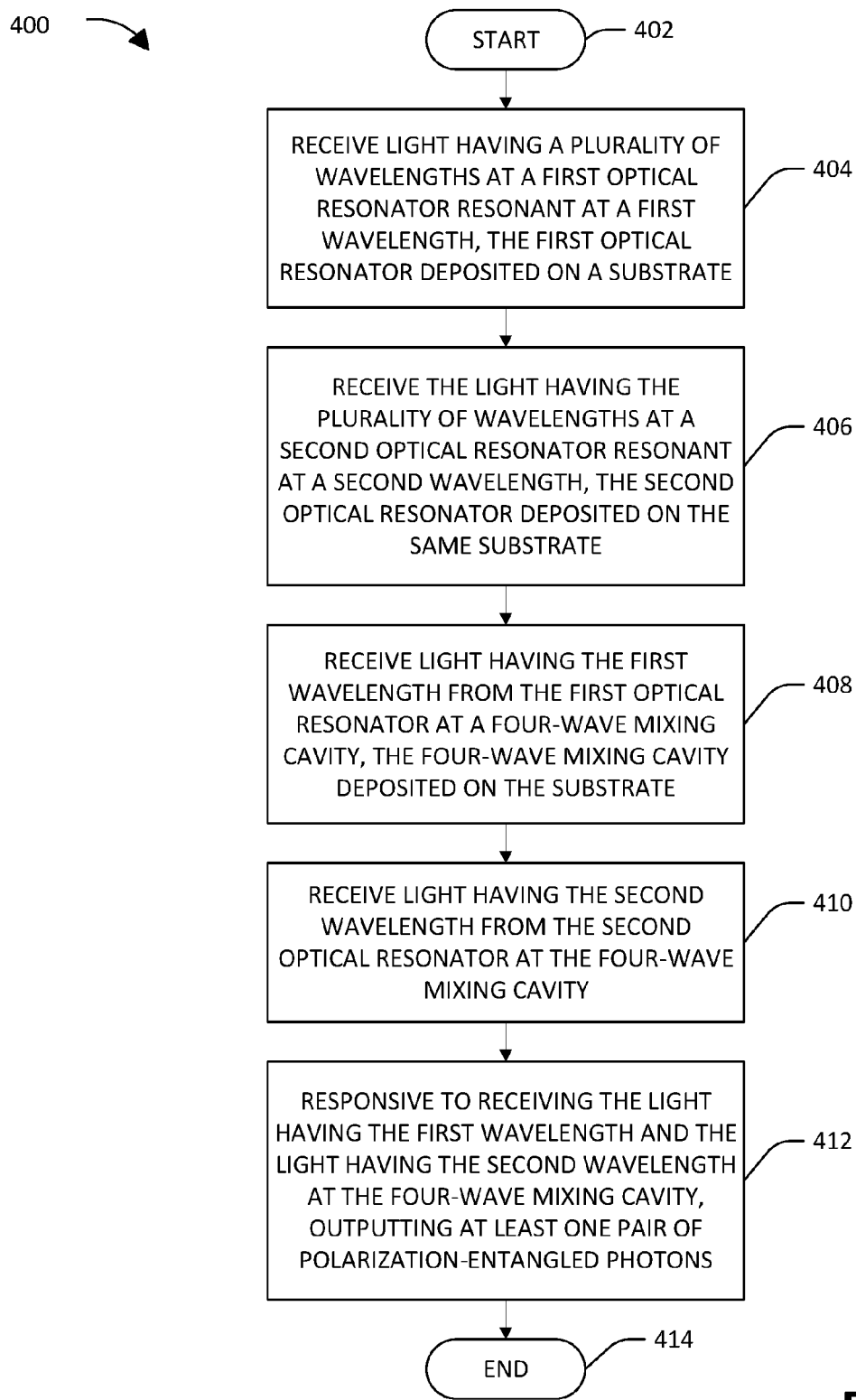
FIG. 4 is a flow diagram that illustrates an exemplary methodology for outputting entangled photon pairs from an on-chip photon source.

FIG. 4 illustrates an exemplary methodology relating to an on-chip entangled photon source. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Referring now to FIG. 4, a methodology 400 that facilitates on-chip generation of entangled photon pairs is illustrated. The methodology 400 begins at 402, and at 404 a first optical resonator receives light having a plurality of wavelengths that can be of varying intensities. The first optical resonator is deposited or installed on a semiconductor substrate. The first optical resonator is resonant at a first wavelength of light in the plurality of wavelengths. Similarly, at 406 the light having the plurality of wavelengths is received at a second optical resonator that is deposited or installed on the same semiconductor substrate and that is resonant at a second wavelength in the plurality of wavelengths. At 408 light having the first wavelength is received from the first optical resonator at a FWM cavity that is also deposited or installed on the same semiconductor substrate. At 410, light having the second wavelength is received from the second optical resonator at the FWM cavity. At 412, responsive to receiving the light having the first wavelength and the light having the second wavelength, the FWM cavity outputs at least one pair of polarization-entangled photons, whereupon the methodology 400 ends at 414.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A photonic circuit comprising components implemented on a same substrate, the components comprising:
    a first resonating cavity that receives light from an optical source and outputs light having a first wavelength;
    a second resonating cavity that receives the light from the optical source and outputs light having a second wavelength that is different from the first wavelength; and
    a four-wave mixing (FWM) cavity that receives the light having the first wavelength and the light having the second wavelength and outputs at least one pair of entangled photons.

2. The photonic circuit of claim 1, wherein the first resonating cavity and the second resonating cavity comprise respective first and second ring resonators.

3. The photonic circuit of claim 1, wherein the FWM cavity comprises a ring resonator.

4. The photonic circuit of claim 1, wherein the at least one pair of entangled photons are polarization entangled photons.

5. The photonic circuit of claim 1, wherein the light received by the respective first and second resonating cavities comprises light having a wavelength band, the wavelength bandwidth comprising the first wavelength and the second wavelength.

6. The photonic circuit of claim 1, wherein a first photon in the at least one pair of photons has a third wavelength and a second photon in the at least one pair of photons has a fourth wavelength.

7. The photonic circuit of claim 6, the components further comprising:
a beam splitter that:
receives the first photon and the second photon;
outputs the first photon to a first transmission path; and
outputs the second photon to a second transmission path;
a photon counter that receives one or more photons from the first transmission path and determines a number of the one or more photons received from the first transmission path; and
an optical modulator that receives one or more photons from the second transmission path and selectively outputs the one or more photons from the second transmission path to a third transmission path based upon the number determined by the photon counter.

8. The photonic circuit of claim 7, wherein the optical modulator outputs the one or more photons from the second transmission path to the third transmission path only when the number of the one or more photons of the first transmission path is determined by the photon counter to be one.

9. The photonic circuit of claim 7, the optical modulator comprising an acousto-optic modulator.

10. The photonic circuit of claim 7, the optical modulator comprising:
an electro-optic modulator; and
a Mach-Zehnder interferometer.

11. The photonic circuit of claim 1, wherein the light having the first wavelength and the light having the second wavelength have respective first and second polarizations, the first polarization orthogonal to the second polarization.

12. The photonic circuit of claim 1, wherein the FWM cavity comprises:
a p-type doped semiconductor material;
an n-type doped semiconductor material; and
an optical cavity formed between the p-type semiconductor material and the n-type semiconductor material; and
wherein further a voltage is induced between the p-type and n-type semiconductor materials.

13. A method, comprising:
receiving light having a plurality of wavelengths at a first optical resonator that is resonant at a first wavelength, the first optical resonator deposited on a substrate;
receiving the light having the plurality of wavelengths at a second optical resonator that is resonant at a second wavelength, the second optical resonator deposited on the substrate, the second wavelength being different from the first wavelength;
receiving light having the first wavelength from the first optical resonator at a four-wave mixing (FWM) cavity, the FWM cavity deposited on the substrate;
receiving light having the second wavelength from the second optical resonator at the FWM cavity; and
responsive to receiving the light having the first wavelength and the light having the second wavelength at the FWM cavity, outputting at least one pair of polarization-entangled photons.

14. The method of claim 13, further comprising:
responsive to receiving the at least one pair of polarization-entangled photons at a beam splitter, outputting at least one photon having a third wavelength to a photon counter and outputting at least one photon having a fourth wavelength to an optical modulator; and
based upon a number of photons received at the photon counter, selectively outputting the at least one photon having the fourth wavelength to a transmission line.

15. The method of claim 14, wherein selectively outputting the at least one photon having the fourth wavelength to the transmission line based upon the number of photons received at the photon counter comprises outputting the at least one photon having the fourth wavelength to the transmission line when the photon counter receives only a single photon.

16. The method of claim 14, wherein selectively outputting the at least one photon comprises:
responsive to receiving more than one photon at the photon counter, using an optical modulator to block transmission of polarization-entangled photons corresponding to the more than one photon on the transmission line; and
responsive to receiving a single photon at the photon counter, using the optical modulator to allow transmission of a corresponding polarization entangled photon.

17. An entangled photon source comprising optical components on a same substrate, the components comprising:
a laser;
a first optical resonator cavity optically coupled to the laser that receives light from the laser and that is resonant at a first wavelength of the light;
a second optical resonator cavity optically coupled to the laser that receives the light from the laser and that is resonant at a second wavelength of the light;
a four-wave mixing (FWM) cavity optically coupled to the first optical resonator cavity and the second optical resonator cavity, wherein the FWM cavity receives light of the first wavelength from the first optical resonator cavity and receives light of the second wavelength from the second optical resonator cavity, wherein further the FWM cavity outputs at least one pair of polarization-entangled photons.

18. The entangled photon source of claim 17, wherein the first optical resonator cavity is configured to be resonant for a first polarization of light, wherein further the second optical resonator cavity is configured to be resonant for a second polarization of light.

19. The entangled photon source of claim 17, wherein the first optical resonator cavity, the second optical resonator cavity, and the FWM cavity comprise respective ring resonator cavities.

20. The entangled photon source of claim 17, wherein the FWM cavity comprises:
a p-type doped semiconductor material;
an n-type doped semiconductor material; and
an optical cavity formed between the p-type semiconductor material and the n-type semiconductor material; and
wherein responsive to a voltage being induced between the p-type semiconductor material and the n-type semiconductor material, free charge carriers in the optical cavity are absorbed by either the n-type material or the p-type material.

* * * * *